United States Patent
Bleeg et al.

(10) Patent No.: US 10,976,181 B2
(45) Date of Patent: Apr. 13, 2021

(54) SYSTEM AND METHOD FOR PATH GUIDANCE PANEL

(71) Applicants: Sandel Avionics, Inc., Vista, CA (US); Priscilla Hickey

(72) Inventors: Robert J. Bleeg, Mercer Island, CA (US); Delmar M. Fadden, Preston, WA (US); Gerald J. Block, Vista, CA (US); Richard W. Taylor, Seattle, WA (US)

(73) Assignee: SANDEL AVIONICS INC., Vista, CA (US)

( * ) Notice: Subject to any disclaimer, the term of this patent is extended or adjusted under 35 U.S.C. 154(b) by 56 days.

(21) Appl. No.: 15/579,510

(22) PCT Filed: Jun. 2, 2016

(86) PCT No.: PCT/US2016/035461
§ 371 (c)(1),
(2) Date: Dec. 4, 2017

(87) PCT Pub. No.: WO2016/196758
PCT Pub. Date: Dec. 8, 2016

(65) Prior Publication Data
US 2018/0149493 A1    May 31, 2018

Related U.S. Application Data

(60) Provisional application No. 62/169,900, filed on Jun. 2, 2015.

(51) Int. Cl.
*G01C 23/00* (2006.01)

(52) U.S. Cl.
CPC .......... *G01C 23/005* (2013.01); *G01C 23/00* (2013.01)

(58) Field of Classification Search
CPC .. G08G 5/0013; G08G 5/0021; G08G 5/0034; G08G 5/0039; G09B 5/02; G09B 19/165; G09B 9/00; G09B 9/08; G09B 9/003; G09B 9/02; G09B 9/048; G09B 9/05; G09B 9/063; G09B 9/301; G09B 9/085; G09B 9/20; G09B 9/30;
(Continued)

(56) References Cited

U.S. PATENT DOCUMENTS

| 6,112,141 | A  | * | 8/2000 | Briffe et al. | ............ | G09G 5/08 |
| 10,037,702 | B1 | * | 7/2018 | Kashi et al. | ............ | G08G 5/00 |

(Continued)

FOREIGN PATENT DOCUMENTS

EP    0999485 A2    5/2000

OTHER PUBLICATIONS

International Search Report and Written Opinion dated Aug. 31, 2016, issued in connection with corresponding International Application No. PCT/US2016/035461 (8 pages total).

*Primary Examiner* — Anthony R Jimenez
(74) *Attorney, Agent, or Firm* — Mayer & Williams PC

(57) ABSTRACT

Systems and methods are disclosed for a path guidance panel. The path guidance panel provides separate display screens for showing the lateral and vertical guidance information. Each screen shows the current state of the respective guidance system, and shows what, if anything, the respective guidance system will do next. This provides a convenient display for the pilot to see the current and future states of the guidance systems of the aircraft.

10 Claims, 13 Drawing Sheets

(58) Field of Classification Search
CPC ....... G09B 9/302; G09B 9/42; G06F 3/04815; G06F 3/0482; G01C 23/00; G01C 23/005; G01C 21/00; G01C 21/20; G01C 21/34; G01C 21/3423; G01C 21/3611; G01C 21/3626; G01C 21/3632; G01C 21/3635; G01C 21/3644; G01C 21/3664; G05D 1/00; G05D 1/0011; G05D 1/0044; G05D 1/005; G05D 1/0202; G05D 1/0223; G05D 1/0257; G05D 1/0268; G05D 1/0274; G05D 1/0276; G05D 1/0278; G05D 1/04; G05D 1/042; G05D 1/06; G05D 1/0808; G05D 1/101; G05D 1/104; G01P 1/00; G01P 13/00
USPC .................................................. 701/454, 467
See application file for complete search history.

(56) References Cited

U.S. PATENT DOCUMENTS

| | | |
|---|---|---|
| 2002/0097635 A1 | 7/2002 | LaRosa et al. |
| 2007/0145184 A1* | 6/2007 | Baudry ................ G05D 1/0202 244/76 R |
| 2008/0004757 A1 | 1/2008 | Ingram |
| 2008/0195309 A1 | 8/2008 | Prinzel, III et al. |
| 2012/0179307 A1 | 7/2012 | Boorman et al. |
| 2012/0179308 A1 | 7/2012 | Boorman |

\* cited by examiner

SYSTEM AND METHOD FOR PATH GUIDANCE PANEL

CROSS-REFERENCE TO RELATED APPLICATIONS

This application claims benefit of priority of U.S. Provisional Patent Application Ser. No. 62/169,900, entitled "System and Method For Path Guidance Panel", filed Jun. 2, 2015, assigned it to the assignee of the present application, and herein incorporated by reference in its entirety.

FIELD OF THE INVENTION

The field of the invention relates to avionics instrumentation, and more particularly to avionics instrumentation involving path guidance.

BACKGROUND OF THE INVENTION

One of the most frequent complaints about current autopilot and flight management systems is confusion about what the automatic system is doing or what it is going to do. This is often expressed by the pilot as "What's it doing now?!" The problem is exacerbated in the pilot's mind by the extensive list of tasks the automatic system could be doing. In general the pilot is expected to understand what the system is doing based on textual indications and annunciations and his or her knowledge of the system. Interpreting the system indications and annunciations often requires significant system knowledge and also requires significant time.

Some current systems use graphics to show what the guidance system is currently doing, but do not make those graphic indications unique, nor do they show what the system will do next.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY OF THE INVENTION

Systems and methods according to present principles provide display screens including graphics showing what a lateral and/or vertical guidance system is currently doing and what (if anything) it will do next. In particular, the screen(s) show qualitatively when the next action will occur.

In one aspect, the invention is directed towards a method for displaying path guidance for a vehicle, comprising: receiving a selection of a guidance mode; receiving a route plan; displaying on a path guidance panel a present state of a guidance system; and displaying on the path guidance panel the route plan.

Implementations of the invention may include one or more of the following. The path guidance panel may separately display lateral information and vertical information. The lateral information and vertical information may be displayed on separate parts of the path guidance panel. The guidance mode may be selected from one of the following: heading, track, lateral navigation, vertical navigation, vertical track angle, speed, and altitude hold. A future state of the guidance system may be displayed on the path guidance panel. The guidance mode may be displayed on the path guidance panel. A future guidance mode may be displayed on the path guidance panel. Position information indicating the vehicle is off the route plan may be received, and an intercept plan may be displayed on the path guidance panel. The vehicle may be an airplane and the route plan may be a flight plan.

In a related aspect, the invention is directed towards a non-transitory computer-readable medium, comprising instructions for implementing the above method.

In another aspect, the invention is directed towards a system for displaying path guidance for a vehicle, comprising: a path guidance panel; a receiving module for receiving a selection of a guidance mode and a route plan; and a display module for displaying on the path guidance panel a present state of a guidance system and the route plan.

Implementations of the invention may include one or more of the following. The path guidance panel may separately display lateral information and vertical information. The lateral information and vertical information may be displayed on separate parts of the path guidance panel. The guidance mode may be selected from one of the following: heading, track, lateral navigation, vertical navigation, vertical track angle, speed, and altitude hold. The display module may further display on the path guidance panel a future state of the guidance system. The display module may further display, on the path guidance panel, the guidance mode. The display module may further display on the path guidance panel a future guidance mode. The receiving module may receive position information indicating the vehicle is off the route plan, and the display module may display on the path guidance panel an intercept plan. The vehicle may be an airplane and the route plan may be a flight plan. Systems and methods according to present principles may interface with autopilots or flight controllers to fully or partially control the flight of a vehicle such as an aircraft.

In another aspect, the invention is directed towards a method for displaying path guidance for a vehicle, including: receiving a selection of a guidance mode; receiving a route plan, including future navigational data; displaying on a path guidance panel a present guidance mode; displaying on the path guidance panel the route plan; and displaying on the path guidance panel an indication of the future navigational data.

Implementations of the invention may include one or more of the following, as well as the implementation details noted above. The future navigational data may include a future guidance mode or a future leg of the route plan. The method may further include receiving a modification to the route plan, and displaying on the path guidance panel an intercept plan, where the vehicle may be caused to intercept the modified route plan. The method may further include receiving a modification to the route plan; calculating an intercept plan based on a current navigational state of the vehicle and the modified route plan; displaying on the path guidance panel the calculated intercept plan including a calculated intercept point, where the vehicle may be caused to intercept the modified route plan, and where the displayed intercept plan and intercept point are displayed along with the route plan and current guidance mode. If the calculating is such that an intercept plan cannot be determined, the method may further include displaying a result of the calculating on the path guidance panel. The current navigational state of the vehicle may include data about the route plan and/or the guidance mode. The result may be that the vehicle is shown to not intercept the modified route plan. The method may further include receiving position information indicating the vehicle is off the route plan; and displaying on the path guidance panel an intercept plan, where the vehicle is directed to intercept the route plan at an intercept point, and where the displayed intercept plan and intercept point are displayed along with the route plan and current guidance mode. The vehicle may be an airplane and the route plan may be a flight plan.

In another aspect, the invention is directed towards a non-transitory computer-readable medium including instructions for implementing the above method.

In another aspect, the invention is directed towards a system for displaying path guidance for a vehicle, including: a path guidance panel; a receiving module for receiving a selection of a guidance mode and a route plan, the receiving module further for receiving future navigational data; and a display module for displaying on the path guidance panel a present guidance mode, the route plan, and an indication of the future navigational data.

Implementations of the invention may include one or more of the following, as well as the implementation details described above. The system may further include an input port for receiving data from a navigational sensor, such as an altimeter, an airspeed indicator, a GPS system, or a gyroscope. The system may further include an output port for transmitting signals to an autopilot or a flight director. The receiving module may be configured to, upon receiving a modification to the route plan, cause the calculating of an intercept plan based on a current navigational state of the vehicle and the modified route plan, and the display module may be configured to display the calculated intercept plan including a calculated intercept point, such that the vehicle is caused and is shown cause to intercept the modified route plan, and such that the display module is further configured to display the intercept plan and intercept point along with the route plan and guidance mode.

Advantages of the invention may include one or more of the following. Systems and methods according to present principles may provide a convenient graphical display, incorporating integrated functionality. The same may enhance fuel efficiency and safety, as well as aircraft navigation. The same may further support future FAA flight-path-supported navigation. The displays according to present principles enhances the pilot's ability to see at a glance what the guidance system is doing and what it will do in the future, while still maintaining an uncluttered display, in contrast to prior systems. Systems and methods according to present principles provide unique simplicity, especially in contrast to other flight displays which show additional information to support other flight tasks, thereby leading to the confusion that has occurred in the past. The pilot not need not "take it on faith" that a navigation system is going to appropriately transition at a proper time in the future—the pilot rather can see an indication of the future mode or the next leg on the screen, thus receiving confirmation that the system will make a proper transition to a next leg or guidance mode according to how the system (i.e., the flight path) was set up.

While prior systems allow operators to construct flight plans by "turning knobs, flipping switches, and pressing buttons", systems and methods according to present principles demonstrate to the pilot graphically the consequences of these actions. If it turns out that the result is not with the operator desires, then the graphical indication will not appear correct. The airplane will not intercept desired paths.

Other advantages will be understood from the description that follows, including the figures.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

BRIEF DESCRIPTION OF THE DRAWINGS

Like reference numerals refer to like elements throughout. Elements are not to scale unless otherwise noted.

DETAILED DESCRIPTION

Figure 1A:
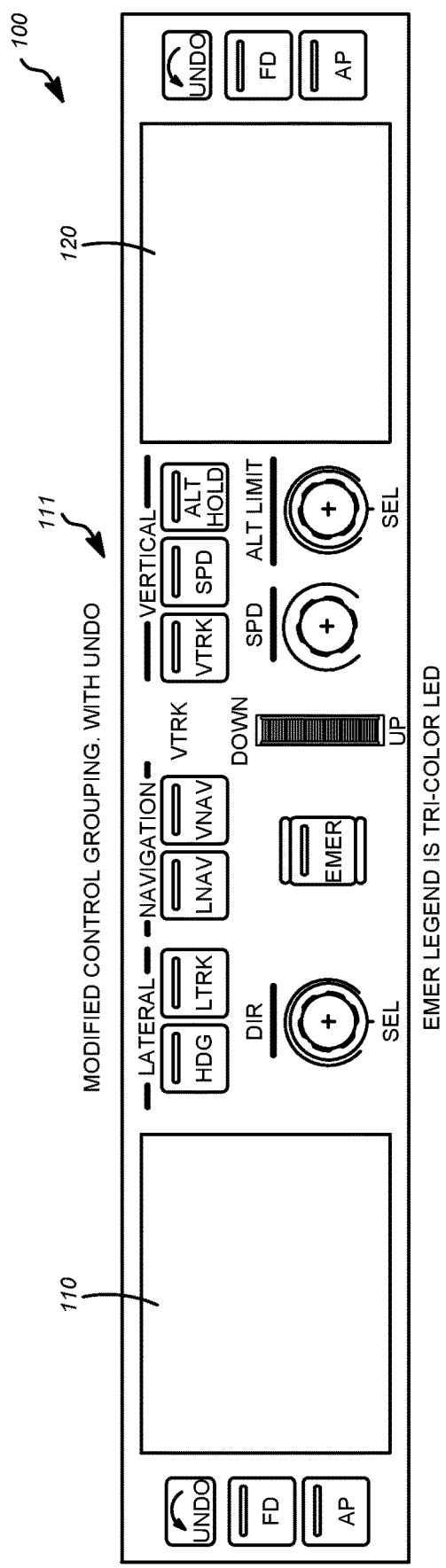
FIG. 1 illustrates an example display according to one aspect of the invention.

Systems and methods according to present principles provide a path guidance panel (PGP) which provides a single location and/or instrument where guidance modes can be selected and tactical control of guidance can be accomplished. One or more of the following guidance modes may be supported, which are indicated by buttons 111 in FIG. 1A:

1. HDG [Heading]—selection of a specific heading which will then be controlled by an autopilot or flight director;

2. LTRK or TRK [Lateral Track or Track]—selection of a specific track angle which will then be controlled by the autopilot or flight director;

3. LNAV [Lateral Navigation]—autopilot or flight director control of flight along a defined lateral flight plan path;

4. VNAV [Vertical Navigation]—autopilot or flight director control of flight along a defined vertical flight plan path or a defined vertical performance task;

5. VTRK or FPA [Vertical Track Angle or Flight Path Angle]—selection of a specific Vertical Flight Path Angle which will then be controlled by the autopilot or flight director;

6. SPD [Speed or Mach]—selection of a specific speed or Mach number which will then be controlled by the autopilot or flight director through the pitch control system—this is commonly referred to as speed-on-elevator control;

7. ALT HOLD [Altitude Hold]—selection to terminate the current climb or descent and hold altitude.

One or more, e.g., two, graphic screens on the panel may be employed to provide an indication of one or more of the above modes (e.g., a current guidance mode and a future guidance mode) as well as to show the pilot what the guidance system is doing at the present time and what it is going to do next. In one implementation, which is depicted as panel 100 in FIG. 1A, the left screen 110 shows lateral information and the right screen 120 shows vertical information.

When the airplane is on the flight plan path and guidance is set to follow that path, the screens will show a continuous line stretching out from the airplane present position near the bottom center of the display. A common situation is that a plane was directed or otherwise diverged did away from a flight path due to an air traffic control direction or an obstacle. If the air traffic situation requires the airplane to maneuver off the planned path temporarily, the heading or track related to the temporary maneuver will show as a continuous line stretching to the top of the screen. The original flight plan path will be shown but may not be connected to the path resulting from the temporary maneuver. (The two lines may or may not cross.)

In certain implementations of systems and methods according to present principles, if the pilot has set up the system properly, to list or otherwise inform the system of upcoming changes in navigation, e.g., new routes or legs, or new guidance modes, an appropriate transition from a current leg and/or guidance mode will be calculated and an intercept to the new routes/legs/mode indicated on the screen. If the pilot has not set the system up properly, the screen will not show a transition or an intercept, giving a graphical indication to the pilot that the system is not configured to perform the transition. Prior systems, for example, do not show intercept waypoints or intercept path lines that curve from a current track to a new one. It is noted that while most of the examples given here are in the context of lateral navigation, similar functionality is provided for vertical navigation. For example, if the pilot does not setup the system properly with regard to vertical navigation, such that a proper intercept is shown and met by a path, the plane would simply continue to go up or down, right through an intercept line. In present systems and methods, in certain implementations, not only intercept paths and points may be shown, but also upcoming guidance modes, if the guidance mode is intended to transition to a new type. The changes in paths may be indicated not only by a new direction but also a new color, and in some cases a new type of line segment, e.g., dotted instead of solid.

Figure 2A:
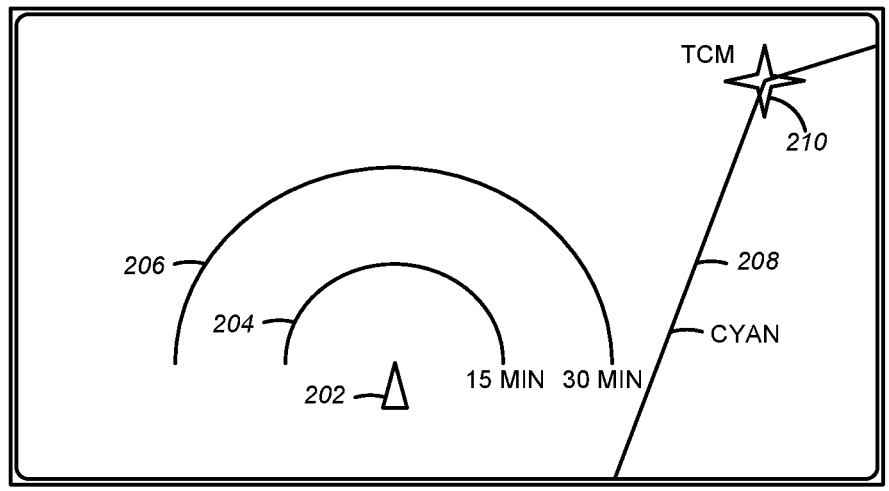
FIGS. 2A through 2V illustrate example displays according to aspects of the invention.
Figure 2B:
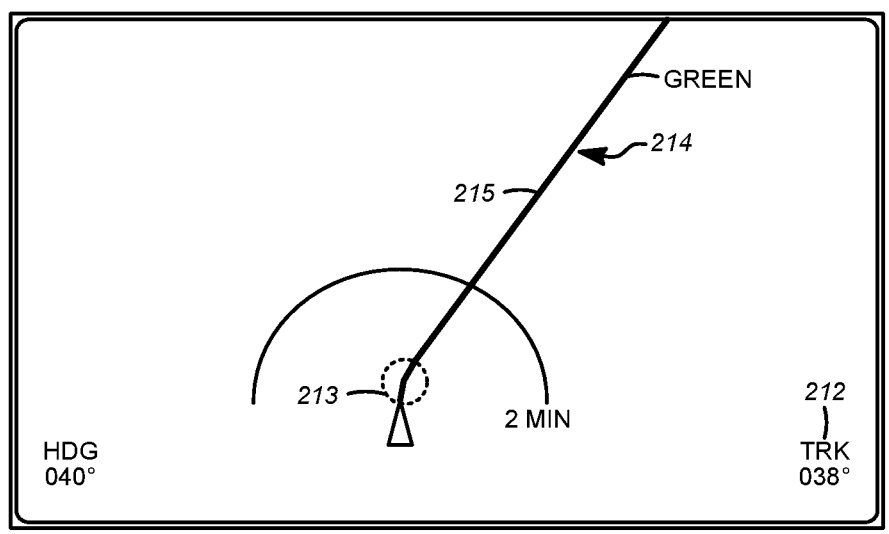
Figure 2C:
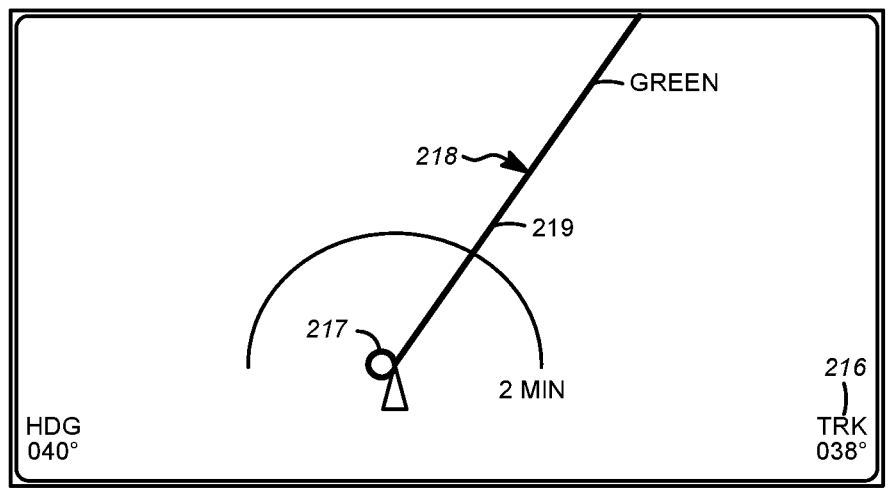
Figure 2D:
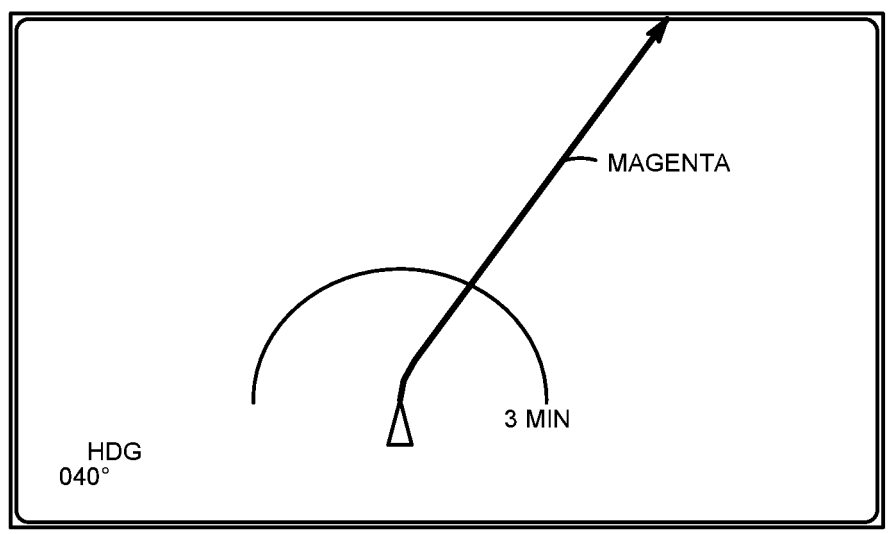
Figure 2E:
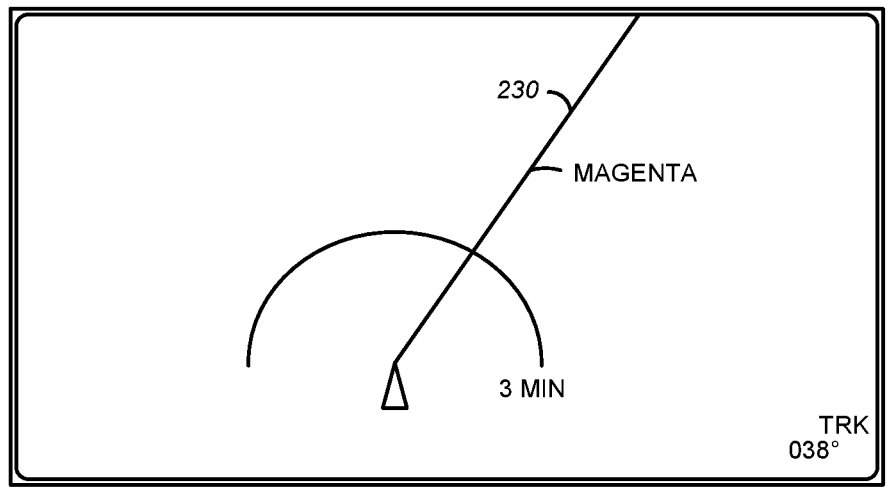
Figure 2F:
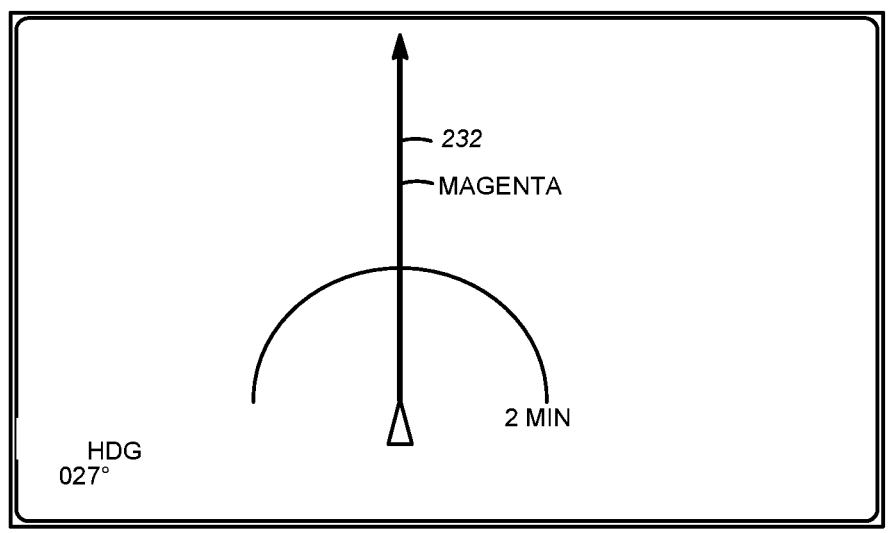
Figure 2G:
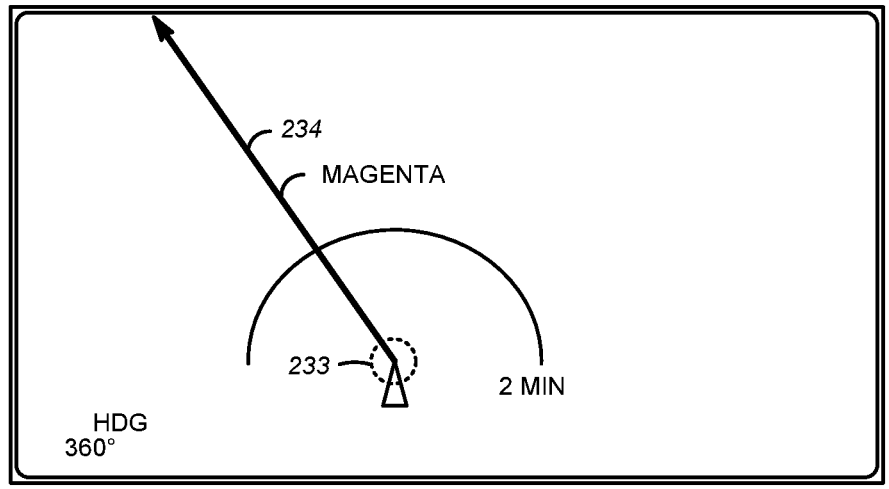
Figure 2H:
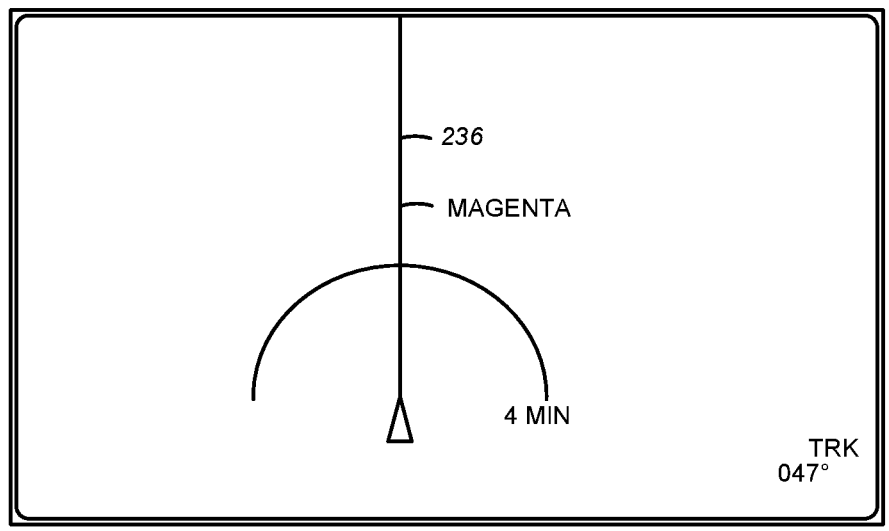
Figure 2I:
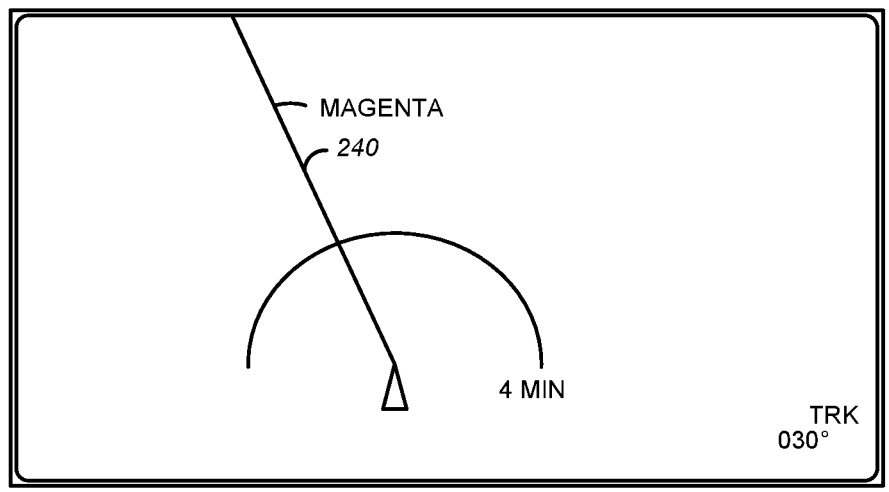
Figure 2J:
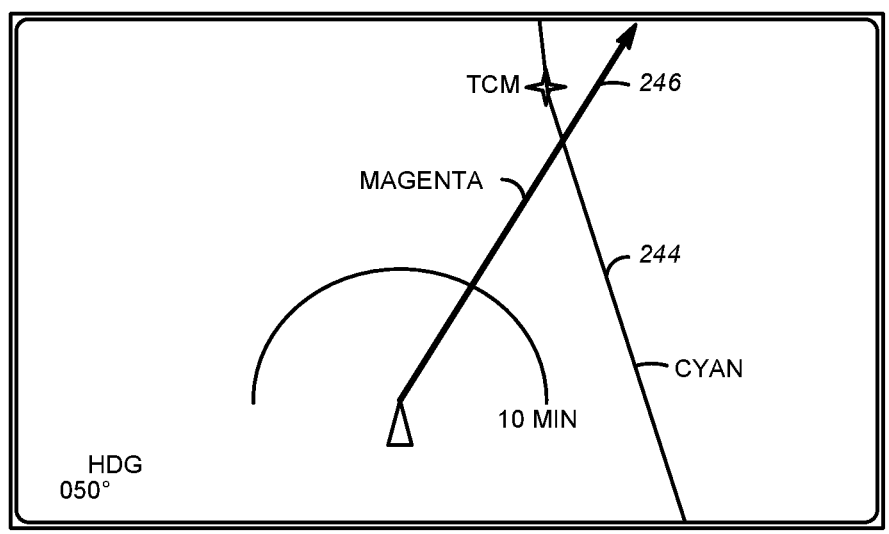
Figure 2K:
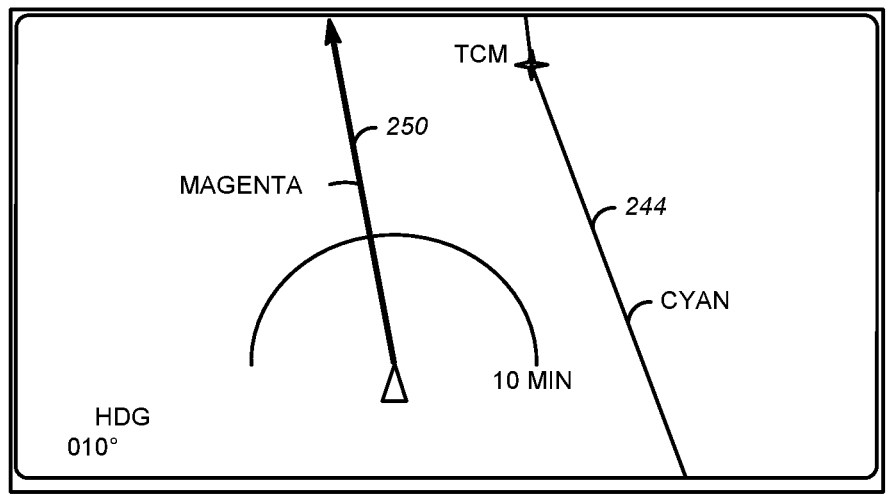
Figure 2L:
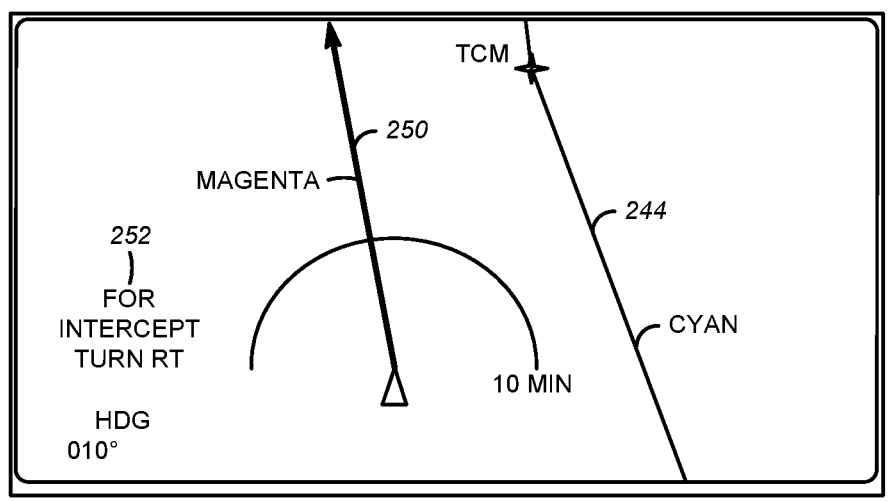
Figure 2M:
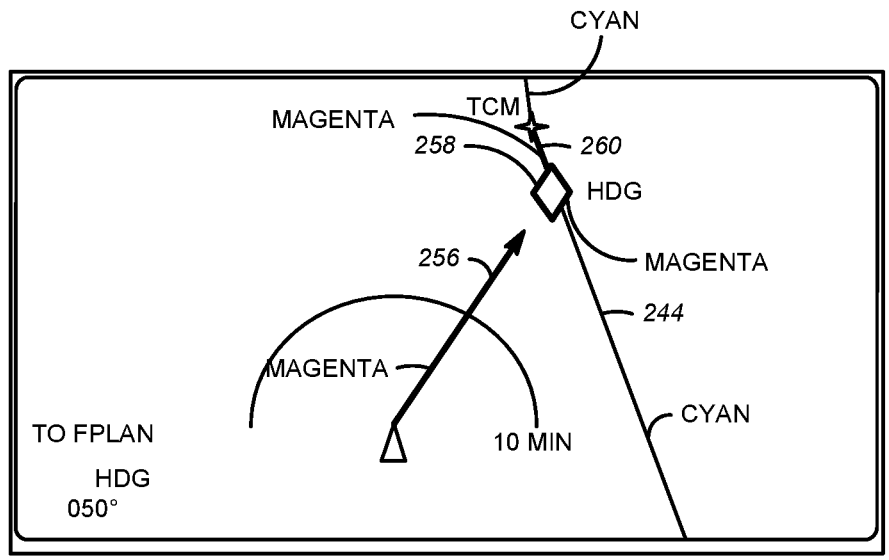
Figure 2N:
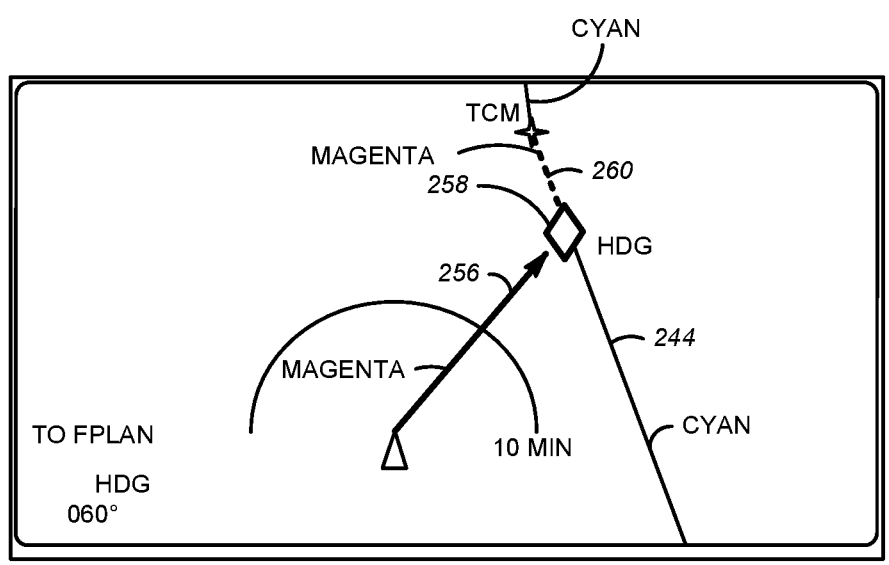
Figure 2O:
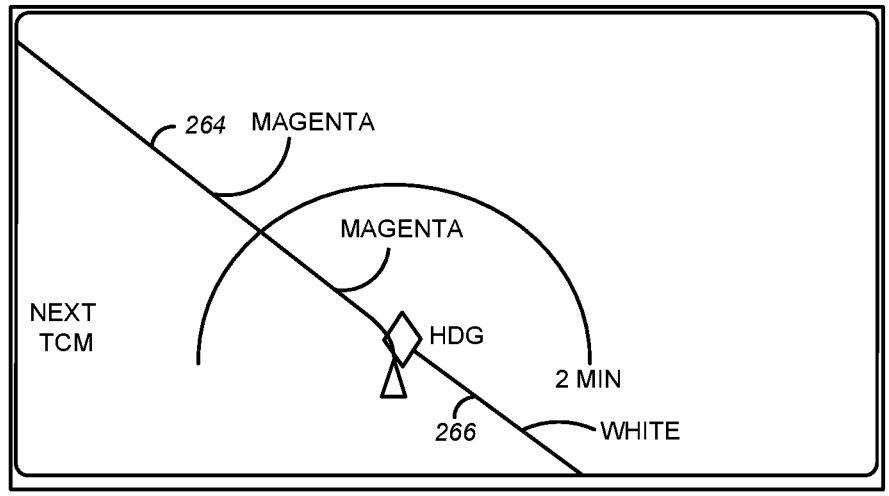
Figure 2P:
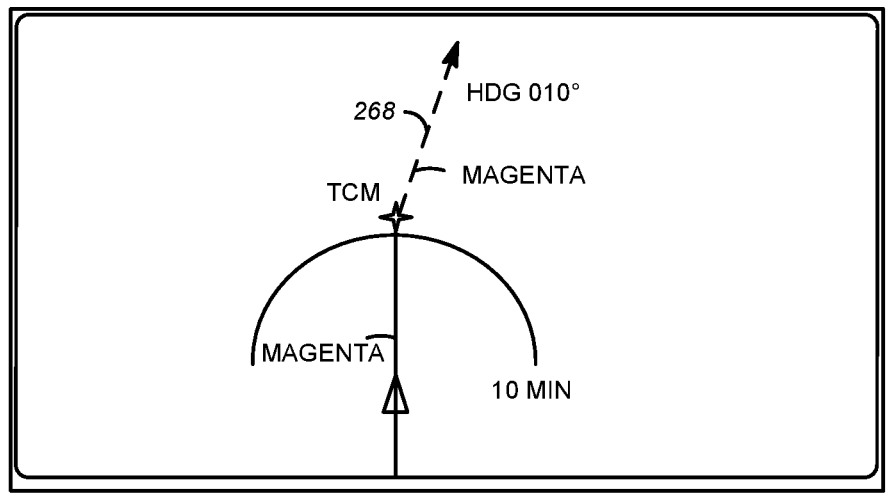
Figure 2Q:
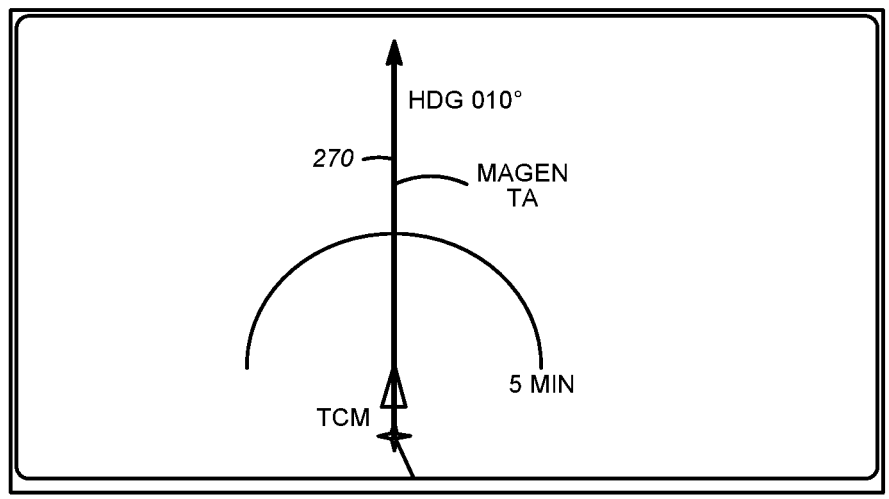
Figure 2R:
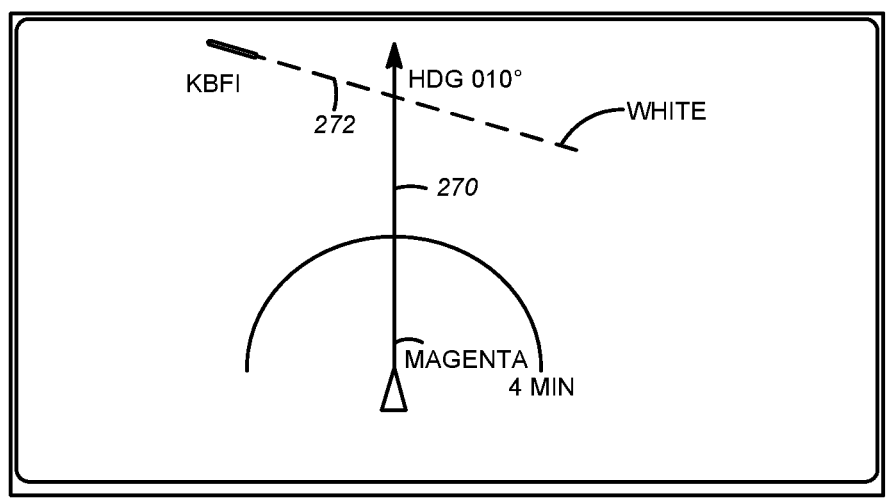
Figure 2S:
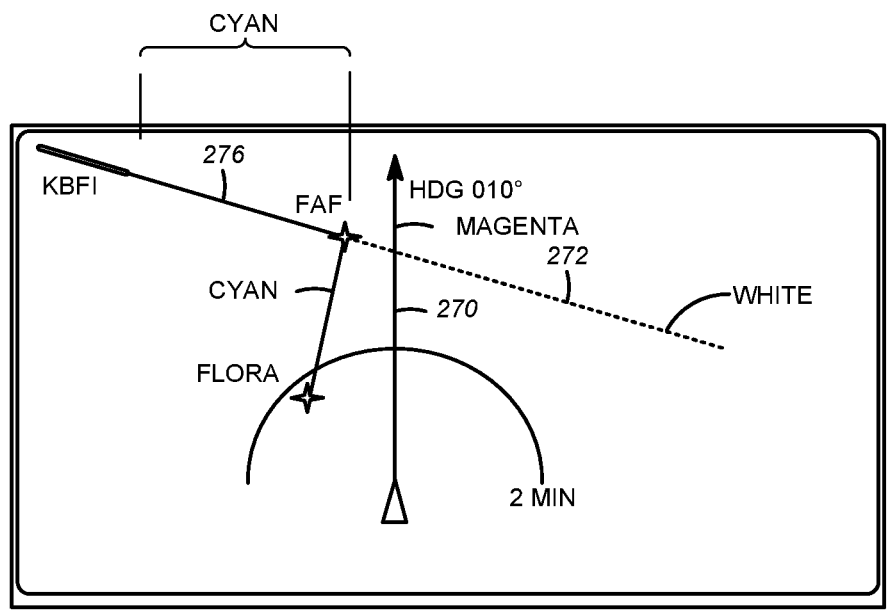
Figure 2T:
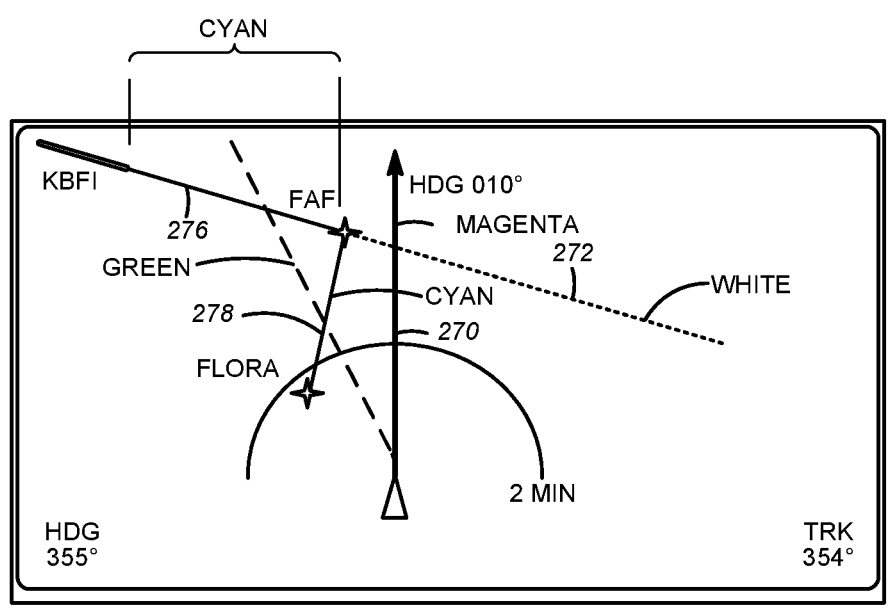
Figure 2U:
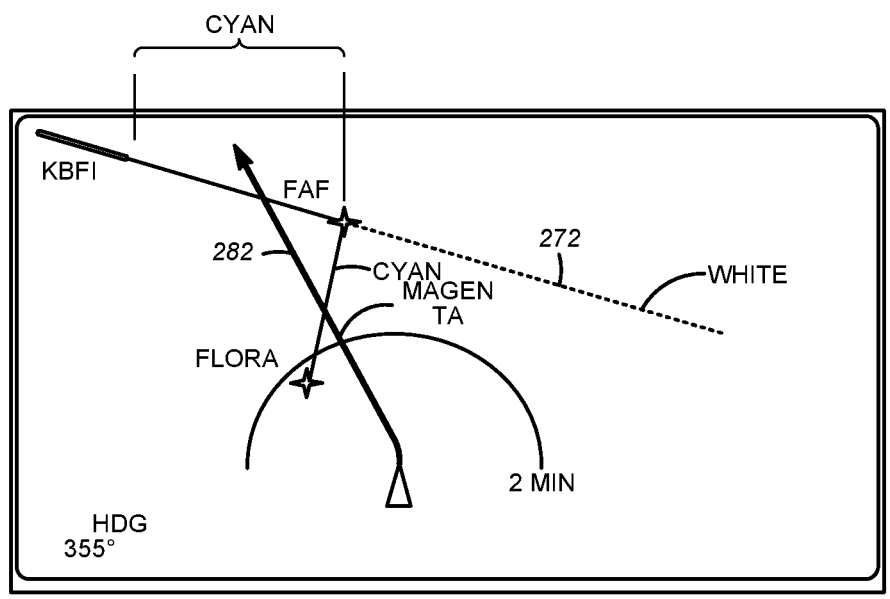
Figure 2V:
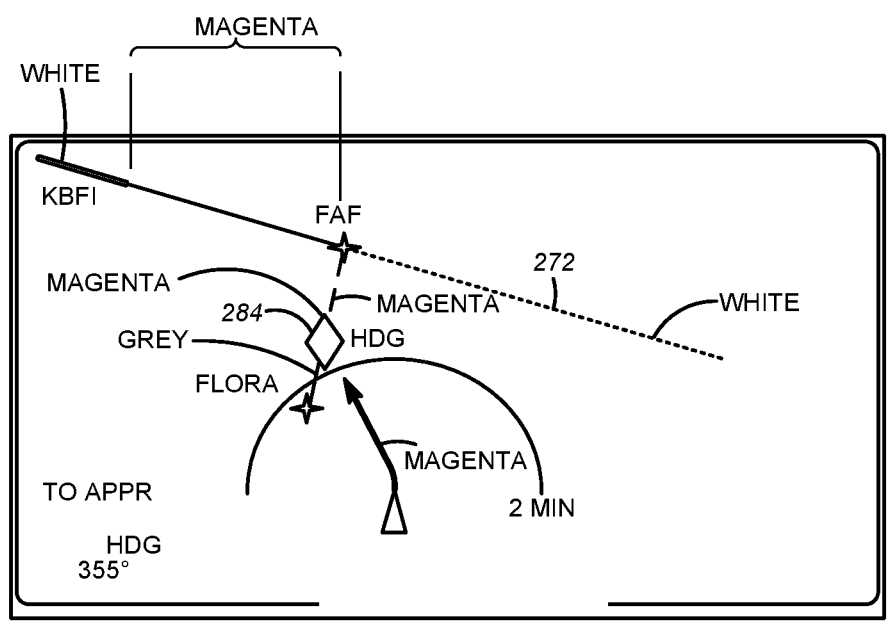

For example, and as depicted in FIGS. 2a through 2v, an airplane has been flown away from a flight plan path. The distance that the airplane is off path may be depicted as the separation between the airplane current position and the location of the flight plan path on the screen. Details of these figs. are described below.

When the need for the temporary maneuver is satisfied the airplane may be cleared to "intercept the flight plan path and resume own navigation." The guidance system is properly set for this maneuver when the intercept path terminates at a point where the current path crosses the original flight plan and the original flight plan segment beyond that crossing point shows on the screen as the "next" leg. This is in contrast to a situation where the guidance system is not properly set, where the current path may cross the intercept path but continues on and does not have a "next leg" coincident with the original flight plan segment at a point beyond the intercept point.

Scaling for the (exemplary two) displays may be managed automatically to ensure that the pilot always or consistently has a clear graphic picture of any maneuvering well in advance of initiation of that maneuvering. On at least one of the displays, a future leg and/or future guidance mode is displayed along with a current position of the aircraft. That is, the active and next guidance mode along with pilot set leg value information (e.g., the selected HDG or the selected TRK in the case of a lateral maneuver; if the maneuver was vertical the pilot-set leg value would be the selected FPA or the selected SPD) may be presented on these two screens as well.

The Path Guidance Panel can interface with either the autopilot or the flight director. Where the PGP interfaces with the autopilot, the airplane can be flown using the Path Guidance Panel. Where the Path Guidance Panel interfaces with the flight director, the pilot can receive guidance commands from the flight director, and can then use the commands to control the airplane. In an alternative implementation, Path Guidance Panel systems and methods according to present principles can set up the situation displays, e.g., horizontal and vertical situation displays, and then the pilot may be enabled to fly the aircraft without guidance but with the path image shown. In other words, in certain implementations, the pilot may be enabled to accomplish most near term tactical plan changes entirely on the Path Guidance Panel.

All information present on the Path Guidance Panel displays may be also available on the primary flight displays (horizontal situation display (HSD), vertical flight display (VFD), and/or vertical situation display (VSD)), although in most cases the primary displays can contain much more information, which can lead to "information overload" and confusion.

Path Guidance Panel displays may use one or more of the following data, e.g., which may be received as inputs from sensors or other instruments:

1. The active lateral and vertical guidance modes including any reference values.
2. The active lateral and vertical flight plan with respect to the airplane current position. and/or
3. Any planned interaction between the active guidance and the lateral or vertical flight plan.

Figure 1B:
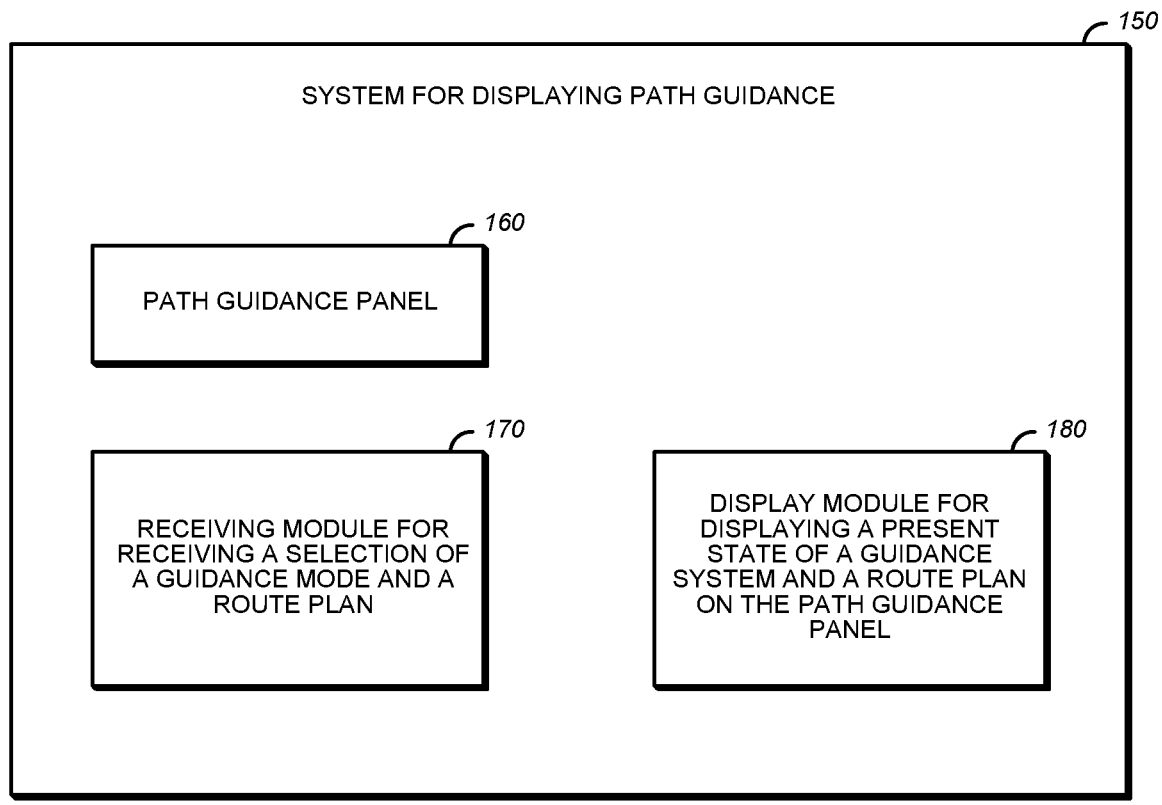

FIG. 1B illustrates system 150 according to an embodiment of the invention. System 150 includes path guidance panel 160 that displays path guidance information. System 150 also includes receiving module 170 that receives information about the path guidance situation, including a selection of a guidance mode and a route plan. Displaying module 180 displays the present state of the guidance system and the route plan on path guidance panel 160. Displaying module 180 may also optionally display a future or next mode of the guidance system, or, alternatively, what the guidance system will do next, e.g., via depiction of a future leg in a different color, dotted line, and so on. This illustrates merely one possible configuration of system modules, and one of ordinary skill in the art will recognize various other possible configurations of a system according to the present principle. Other system components may also be included.

The following description illustrates various example operations of the Path Guidance Panel. Certain colors are specified in the following description, e.g., green and magenta, but any color may be substituted for the specified colors. Furthermore, certain values, such as TRK and HDG values, and associated indicators are listed as being in either the lower left or lower right corner, but such values and indicators may be in any part of the screen. Also, certain lines are indicated as solid or dashed, but other types of lines may be used. The colors, locations, and line types are merely exemplary, and one of ordinary skill in the art will understand that other colors, locations, and line types may be used. For example, instead of green and magenta, cyan and red may be used. In addition, instead of the lower left and lower right corners, other portions of the screen may be used, or in some cases such values need not be displayed. Also, instead of solid and/or dashed lines, dotted or lines with both dashes and dots may be used.

Lines and line segments are indicated in the drawings noted below. Generally the entire line or line segment is of the indicated color, unless otherwise noted on the figure.

FIG. 2A shows an example steady state flight display with no APFD (autopilot/flight director) modes or functions selected. This example demonstrates the case of steady state flight with no APFD (autopilot/flight director) modes or functions selection, which may be a normal background for LGS displays.

In this display mode, the orientation may be, e.g., TrackUp. Airplane symbol 202 may be in the lower center of the display. Time rings 204 and 206 show the projected position of the airplane after the time shown, e.g., the position of the airplane after 15 minutes for time ring 204, and the position of the airplane after 30 minutes for time ring 206. The number of minutes associated with each time ring will vary depending on other elements of the display. Generally, the first ring will show ⅓ to ½ of the screen range, and the second ring will be at twice the time. If the screen is cluttered, the time rings may be associated with different times.

The display may also show the following, if in range: 1) flight plan line 208; 2) flight plan waypoint 210, with name; 3) a selected VOR (not shown); 4) and an airport (not shown). Zero or more of the above may be shown on the display, depending on what is in range. One of ordinary skill in the art will recognize other possible configurations for the flight display.

In FIG. 2A, no pilot action is contemplated. Regarding LGS range, if the next flight plan waypoint is within 200 nautical miles in front of the airplane, a range may be selected to position that waypoint on the screen. Otherwise, the range may be set to 15 nautical miles or groundspeed/10, whichever is greater.

FIG. 2B shows a situation in which a direction is preset with a total turn less than 180° from the present heading. The APFD (autopilot/flight director) is either off or LNAV is engaged. In particular, FIG. 2B shows the flight display after the operator turns the DIR knob clockwise to 040° degrees. DIR value 212 is displayed at the lower right corner of the screen. Reference line 214 shows the track angle consistent with the reference heading and the current wind. Reference line 214 starts at the airplane and shows the arc necessary to accomplish the turn to the new track value. DIR value 212 and reference line 214 may be a particular color, e.g., green. The text "Path Guidance Panel REF" may be displayed showing that the value came from the Path Guidance Panel. The arc to the right shows what guidance would command if that heading or track is selected.

Reference line 214 may be constructed of an initial curved segment 213 and a straight segment 215. The straight segment is oriented at the track angle consistent with treating the reference value as a heading and the existing wind. The curved portion 213 is a constant true airspeed (TAS), still air, circle based on a turn at an APFD (autopilot/flight director) supplied bank angle, stretched in the direction of the wind by the wind vector existing before any maneuvering is initiated. (Freezing the wind vector avoids the noise in the wind vector calculation that will occur during turning flight.) The straight segment attaches to the circular portion at the point where the tangent to the circle is equal to the predicted track angle. The combination of stretched circle and straight line remains attached to the airplane present position and orientation, and is thus not fixed to the earth's surface. When the heading error is less than 30°, the circle segment may be constructed using current groundspeed in place of TAS and ignoring the wind.

In contract, to FIG. 2B, FIG. 2C shows the flight display after the operator turns the DIR knob counterclockwise to 040°, i.e., greater than 180°. This is understood to be an intentional turn in the long turn direction. Again, the APFD (autopilot/flight director) is either off or LNAV is engaged. DIR value 216 is displayed at the lower right corner of the screen. Reference line 218 shows the track angle consistent with the selected heading and the current wind. Reference line 218 starts at the airplane and shows the arc 217 necessary to accomplish the turn to the new track value 217 in the direction indicated by the turn knob rotation (counterclockwise). DIR value and reference line 218 may be a particular color, e.g., green. The text "Path Guidance Panel REF" may be displayed showing that the value came from the Path Guidance Panel. The arc to the left shows what guidance would do if the heading or track mode was selected.

FIG. 2D shows the flight display after the operator turns to a preset HDG, such as when a pilot is being vectored by the air traffic control (ATC). Again the APFD (autopilot/flight director) is either off or LNAV is engaged. The previous reference line, e.g. reference line 214 or reference line 218, becomes a different color, e.g., solid magenta, with an arrow head indicating a track based on a heading. "Path Guidance Panel HDG" may also be displayed, and may be in the same color, e.g., magenta. After the operator turns to the preset HDG, the airplane turns so that the actual heading value matches the preset value.

FIG. 2E shows the flight display after the operator turns to a preset TRK, such as when a pilot is maneuvering with respect to an object on the ground. Again the APFD (autopilot/flight director) is either off or LNAV is engaged. The preset value is now treated as a track angle and therefore shifts as necessary to show the track at the reference angle. "Path Guidance Panel TRK" may be displayed on the screen in the lower right corner. The solid preset track line with the appropriate initial curvature to complete the turn becomes solid track line 230 stretching to the edge of the screen. Solid track line 230 may be a different color, e.g., magenta. The airplane turns as necessary so that the actual track angle value matches the preset value.

As above, solid track line 230 is constructed of an initial curved segment and a straight segment. The straight segment is oriented at the reference track angle. The curved portion is a constant TAS, still air, circle based on a turn at an APFD (autopilot/flight director) supplied bank angle, stretched in the direction of the wind by the wind vector existing before any maneuvering is initiated. (Freezing the wind vector avoids the noise in the wind vector calculation that will occur during turning flight.) The straight segment attaches to the circular portion at the point where the tangent to the circle is equal to the reference track angle. The combination of stretched circle and straight line remains attached to the airplane present position and orientation. It is not fixed to the earth's surface. When the track error is less than 30°, the circle segment may be constructed using current groundspeed in place of TAS and ignoring the wind.

FIG. 2F shows the flight display after the operator changes HDG to 360 degrees, such as when being vectored by the ATC. The current "direction" value is synced to the current heading and the numeric value may be displayed at the lower left corner. Solid line 232 terminating in an arrow head appears at the track angle consistent with the current heading. "Path Guidance Panel HDG" may be displayed at the lower left of the screen. The current "direction" value, solid line 232, and the "Path Guidance Panel HDG" indicator may be a uniform color, e.g., magenta.

APFD (autopilot/flight director) switches to Heading mode and syncs direction control to current heading. No airplane maneuvering is required except that required to hold the heading. There is no circle segment since the heading error is zero or near zero and no turn is required.

FIG. 2G shows the flight display after the operator turns the DIR knob to a new heading angle. Predicted track line 234 rotates to follow the heading angle. "Path Guidance Panel HDG" may remain displayed in the lower left corner. The Path Guidance Panelheading angle numeric value is incremented by the direction of angle change. A circle segment 233 is added at the airplane end of predicted track line 234 as the difference between current heading and Path Guidance Panel target heading changes away from zero. The airplane turns so that the actual heading value matches the newly selected value. It is, however, not necessary to compute the circle segment for small heading angle errors. Predicted track line 234, the "Path Guidance Panel HDG" indicator, and the Path Guidance Panel heading angle numeric value, may be a uniform color, e.g., magenta.

FIG. 2H shows the flight display after the operator changes TRK to 030 degrees. Solid track line 236 appears at the current track angle. "Path Guidance Panel TRK" may be displayed in the lower right. The current "direction" value is synced to current track angle and the numeric value may also be displayed in the lower right corner of the screen. Solid track line 236, the "Path Guidance Panel TRK" indicator, and the current track angle may be a uniform color, e.g., magenta.

The APFD (autopilot/flight director) switches to Track Select mode and synchronizes the direction control to the current track angle. No airplane maneuvering is necessary except that required to hold the track angle.

FIG. 2I shows the flight display after the operator turns the DIR knob. Solid target track line 240 rotates to follow the direction angle. "Path Guidance Panel TRK" remains displayed in the lower right corner, along with the Track angle numeric value, which is incremented by the direction of angle change. A circle segment is added at the airplane end of the target track line as the difference between current track and Path Guidance Panel track angle changes away from zero. Track line 240, "Path Guidance Panel TRK", and the Track angle numeric value may be a uniform color, e.g., magenta. The screen range may remain at, e.g., 200 nautical miles. In this example, the airplane turns so that the actual track angle value matches the newly selected value.

FIG. 2J shows the flight display after the operator turns to an ATC specified heading, e.g., 050°, to intercept a flightplan as when ATC issues a clearance to fly a vector to intercept an existing assigned route. In this case, the operator may accomplish the task, turning to the cleared heading, using either the "Turn to a Preset HDG" or the "Change HDG" actions, as in FIG. 2D, 2E, or 2F above. FIG. 2J shows flight plan path 244 within the screen range and to right of the airplane, however, the flight plan line may or may not be visible on this screen. In FIG. 2J, predicted track line 246 associated with the cleared heading does cross flight plan line 244 so a practical intercept exists. Screen range permitting, the necessary turning circle segment may be added at the airplane end of track line. In one implementation, the screen range adjusts to show the next waypoint a particular distance below the top edge of the screen, thus accomplishing the goal of showing what will be done next visualized on the display at the same time that the current guidance mode and leg/route are displayed. In this case, the airplane turns to and holds the heading select angle.

FIG. 2K is similar to FIG. 2J, but indicates the situation after the operator turns to heading 010°, e.g., if the cleared heading had been 010°. As can be seen, the angle of resulting track 250 does not intercept flight plan 244. As above, the airplane turns to and holds the heading select angle.

FIG. 2L shows the flight display of FIG. 2K after the operator presses LNAV. The Path Guidance Panel HDG value remains displayed. If the probable track 250 resulting from the selected heading does not intercept the flight plan 244 as in FIG. 2K, the Path Guidance Panel HDG annunciation remains unchanged and a nominal heading to intercept 252 is annunciated in yellow (or another color), e.g., "For Intercept Turn RT". LNAV ARM may be displayed on the primary flight display (PFD) Flight Mode Annunciator. The pilot can cancel the intercept annunciation by changing the Path Guidance Panel heading to any value that does create an intercept (see FIG. 2M below). The pilot can cancel the annunciation and LNAV ARM by selecting Undo. In order to show the next route leg, the LGS ranges as necessary to ensure that the flight plan intercept position is shown well within the periphery of the screen. As above, the airplane turns to and holds the heading select angle.

FIG. 2M shows the flight display of FIG. 2J after the operator presses LNAV. In particular, if the probable track resulting from the selected heading does intercept the flight plan, as in FIG. 2J, LNAV is activated and the annunciation in the lower left corner may become "Path Guidance Panel HDG to FPLAN." The active flight plan leg becomes a heading segment from the present position. The heading segment (magenta) terminates at flight plan line 244 (which may be, e.g., cyan) and the next leg will be the flight plan leg to TCM. Conditional waypoint 258 (magenta) marks the approximate location of the intercept. Predicted track 256 (magenta) consistent with the Path Guidance Panel HDG value may be shown as a bold line terminated with an arrow head close to, but not touching, conditional waypoint 258. Conditional waypoint 258 is shown as a diamond, but may be a different symbol. Flight plan line 260 following conditional waypoint 258 may become a bold dotted line, also in magenta. Predicted track 256 and flight plan line 260 may be a particular color, e.g., magenta. These lines make it clear that guidance will transition to the flight plan at the conditional waypoint. HDG SEL (heading selected) remains displayed as does flight plan line 244 leading to the conditional waypoint to remind the pilot that: 1) guidance is controlling to the specified heading and 2) the conditional waypoint can be adjusted by changing the Path Guidance Panel heading value. In order to show the next route leg, the LGS ranges as necessary to ensure that the flight plan intercept position is shown well within the periphery of the screen.

In operation, the guidance changed to LNAV when the LNAV button was selected. The current leg is a pilot selected heading leg with a fixed termination line. The location of the conditional point will shift along the flight plan line as the result of any changes in drift angle that occur while the airplane is on the heading leg.

FIG. 2N shows the flight display after the ATC issues a new vector before the airplane reaches the conditional waypoint. The operator then turns the DIR knob to reflect the new heading value, and the airplane turns to maintain the newly selected heading. The guidance mode is thus, at this point, LNAV with Path Guidance Panel HDG. As the knob is turned, if the track resulting from the new heading still intercepts the original flight plan path, conditional waypoint 258 slides along original flight plan line 244 as necessary to show the modified intercept point. The guidance mode is not changed so long as an intercept point can be calculated. If the heading is changed such that an intercept does not exist, the guidance mode reverts to LNAV ARM and the LGS reverts to the screen shown in 2L above with a new recommended intercept heading.

FIG. 2O shows the flight display after the conditional waypoint is reached. As the airplane nears the conditional point, a turn is initiated to intercept the next path segment. The path following, subsequent to the conditional waypoint, seeks to minimize the path deviation error. The curved a transition line is always computed since it is used by the guidance, but may not be visible until the LGS range is short.

The Path Guidance Panel HDG annunciation and associated selected heading value, if present, are removed. The annunciation in the lower left corner may now state "FPLAN to TCM." As the airplane passes the intercept waypoint, flight plan segment 264 following the intercept point becomes a solid line in a particular color, e.g., magenta. Flight plan path 266 prior to the conditional waypoint and conditional waypoint 258 itself become a different color, e.g., gray. The Undo annunciator, if present, may go off since all of the previous flight plan modification have been completed and flown.

FIG. 2P shows the flight display if the next leg of the flight plan is a HEADING leg, as might be true for the last leg of a standard terminal arrival route (STAR). The guidance mode may still be set to LNAV. The leg after TCM 268 may be dashed, indicating it is the next leg. The leg has no terminator and may end with a heading arrow. The flight plan heading value is shown and the angle of the dashed line is adjusted by the calculated drift angle for that leg.

FIG. 2Q shows the flight display on a flight plan heading leg, again where the guidance mode is, e.g., LNAV. Heading leg 270 is now solid with a heading arrow. Heading leg 270 may be a particular color, e.g., magenta. It ends short of the edge of the screen. The flight plan heading value is shown near the end of the heading leg line.

FIG. 2R shows the flight display on a flight plan heading leg approaching destination runway centerline 272. The display is similar to the display in FIG. 2Q, but with the destination runway and extended runway centerline displayed.

FIG. 2S shows the flight display on a flight plan heading leg with an approach procedure selected but with no transition to the approach procedure. The display is similar to the display in FIG. 2R above. The selected approach procedure 276 may be a particular color, e.g., cyan. There is a break in the flight plan due to the unterminated heading leg, thus the approach procedure is not the color of the flight plan, e.g., magenta. The guidance will continue to command maintaining the heading until the pilot takes action to change the leg.

FIG. 2T shows the flight display on a flight plan heading leg with an approach procedure selected. ATC issues a heading vector to intercept the approach procedure. In response, the operator selects the ATC vector value using the Path Guidance Panel DIR knob. Moving the DIR knob sets a preset heading or track value and potential resulting path 278 is depicted with a dashed preset line. Potential resulting path 278 may be a particular color, e.g., green.

FIG. 2U shows the flight display after the operator selects HDG mode on the Path Guidance Panel. The preset heading becomes the active leg 282, and guidance changes to the preset heading. This step is generally necessary so that the pilot can designate heading or track as appropriate. The sequence for FIGS. 2T and 2T may vary: the pilot could have selected HDG mode first and then changed the DIR knob setting.

FIG. 2V shows the flight display after the operator selects LNAV mode on the Path Guidance Panel. Conditional waypoint 284 for the approach intercept point is shown using the predicted track derived from the selected heading value. As with all HDG/TRK intercepts, the DIR knob can be used to adjust the position of the conditional waypoint. Selection of LNAV could have been done immediately after selecting HDG or delayed until ATC cleared the airplane for the intercept.

Guidance continues to maintain the selected heading value until reaching the transition point for the leg leading to FAF.

Systems and methods may be provided such that a pilot can enter a future guidance mode or a future leg information, e.g., such as via entering VOR data, future navigation data, future guidance mode data, and so on. Generally, with many current flight management systems/computers, the same are capable of constructing the details of an entire path. And thus, systems and methods according to present principles may be particularly useful where flight plan or mode has changed due to ATC direction or obstacle avoidance, and may typically include entering one to a few future guidance modes or waypoints, and so on. Accordingly, a Path Guidance Panel device may include appropriate data storage to store such waypoints and to recall such when needed to perform systems and methods disclosed here. Systems and methods according to present principles may also be particularly useful in aircraft with older flight management systems/computers.

The system and method may be fully implemented in any number of computing devices. Typically, instructions are laid out on computer readable media, generally non-transitory, and these instructions are sufficient to allow a processor in the computing device to implement the method of the invention. The computer readable medium may be a hard drive or solid state storage having instructions that, when run, are loaded into random access memory. Inputs to the application, e.g., from the plurality of users or from any one user, may be by any number of appropriate computer input devices. For example, users may employ a keyboard, mouse, touchscreen, joystick, trackpad, other pointing device, or any other such computer input device to input data relevant to the calculations. Data may also be input by way of an inserted memory chip, hard drive, flash drives, flash memory, optical media, magnetic media, or any other type of file-storing medium. The outputs may be delivered to a user by way of a video graphics card or integrated graphics chipset coupled to a display that maybe seen by a user. Alternatively, a printer may be employed to output hard copies of the results. Given this teaching, any number of other tangible outputs will also be understood to be contemplated by the invention. For example, outputs may be stored on a memory chip, hard drive, flash drives, flash memory, optical media, magnetic media, or any other type of output. It should also be noted that the invention may be implemented on any number of different types of computing devices, e.g., personal computers, laptop computers, notebook computers, net book computers, handheld computers, personal digital assistants, mobile phones, smart phones, tablet computers, and also on devices specifically designed for these purpose. In one implementation, a user of a smart phone or wi-fi-connected device downloads a copy of the application to their device from a server using a wireless Internet connection. An appropriate authentication procedure and secure transaction process may provide for payment to be made to the seller. The application may download over the mobile connection, or over the WiFi or other wireless network connection. The application may then be run by the user. Such a networked system may provide a suitable computing environment for an implementation in which a plurality of users provide separate inputs to the system and method. In the below system where avionics controls and information systems are contemplated, the plural inputs may allow plural users to input relevant data at the same time.

The invention claimed is:

1. A method for displaying path guidance for an airplane, comprising:

receiving a selection of a guidance mode;

receiving a flight plan, including future navigational data, and receiving a modification to the flight plan, caused through a direction knob, to change the aircraft heading angle;

calculating an intercept plan based on a current navigational state of the airplane and the modified flight plan;

displaying on a path guidance panel an indication of the selected guidance mode;

displaying on the path guidance panel the flight plan; and displaying on the path guidance panel an indication of the future navigational data and the calculated intercept plan including a calculated intercept point.

2. The method of claim 1, wherein the path guidance panel separately displays lateral information and vertical information, wherein the lateral information and vertical information are displayed on separate parts of the path guidance panel.

3. The method of claim 1, wherein the guidance mode is selected from one of the following: heading, track, lateral navigation, vertical navigation, vertical track angle, speed, and altitude hold.

4. The method of claim 1, wherein the future navigational data includes a future guidance mode or a future leg of the flight plan.

5. The method of claim 1, wherein when an intercept plan cannot be calculated, displaying a result of the calculating on the path guidance panel, wherein the airplane is shown to not intercept the modified flight plan.

6. The method of claim 1, further comprising the steps of:

receiving position information indicating the airplane is off the flight plan; and displaying on the path guidance panel the intercept plan, wherein the airplane is directed to intercept the flight plan at a revised intercept point, and wherein the displayed intercept plan and revised intercept point are displayed along with the flight plan and current guidance mode.

7. A non-transitory computer-readable medium comprising instructions for implementing the method of claim 1.

8. The method of claim 1, wherein a current navigational state of the airplane includes data about the flight plan and/or the guidance mode.

9. A system for displaying path guidance for an airplane, comprising:

a path guidance panel;

a receiving module for receiving a selection of a guidance mode and a flight plan, the receiving module further for receiving future navigational data; and a display module for displaying on the path guidance panel a present guidance mode, the flight plan, and the indication of the future navigational data, wherein the system is configured to process the method steps of claim 1.

10. The system of claim 9, wherein the system further comprises an input for receiving data from a navigational sensor, being selected from the group consisting of an altimeter, an airspeed indicator, a GPS system, or a gyroscope and/or an output port for transmitting signals to an autopilot or a flight director.

\* \* \* \* \*